(12) United States Patent
Reid et al.

(10) Patent No.: US 10,488,060 B2
(45) Date of Patent: Nov. 26, 2019

(54) AIR FILTER GRID SYSTEM

(71) Applicant: ROBOVENT PRODUCTS GROUP, INC., Sterling Heights, MI (US)

(72) Inventors: John Reid, Troy, MI (US); James Reid, Blacklick, OH (US)

(73) Assignee: ROBOVENT PRODUCTS GROUP, INC., Sterling Heights, MI (US)

( * ) Notice: Subject to any disclaimer, the term of this patent is extended or adjusted under 35 U.S.C. 154(b) by 193 days.

(21) Appl. No.: 15/812,985

(22) Filed: Nov. 14, 2017

(65) Prior Publication Data

US 2018/0135872 A1  May 17, 2018

Related U.S. Application Data

(60) Provisional application No. 62/421,493, filed on Nov. 14, 2016.

(51) Int. Cl.
*F24F 3/16* (2006.01)
*F24F 13/02* (2006.01)
*B01D 46/12* (2006.01)
*F24F 13/28* (2006.01)

(52) U.S. Cl.
CPC ............ *F24F 3/1607* (2013.01); *B01D 46/12* (2013.01); *F24F 13/02* (2013.01); *F24F 13/0245* (2013.01); *F24F 13/0272* (2013.01); *F24F 13/28* (2013.01)

(58) Field of Classification Search
CPC .......... F24F 3/16; F24F 3/1603; F24F 3/1607; F24F 13/02; F24F 13/0209; F24F 13/0245; F24F 13/0272; F24F 13/06; F24F 13/28; B01D 46/12
See application file for complete search history.

(56) References Cited

U.S. PATENT DOCUMENTS

| | | | | |
|---|---|---|---|---|
| 6,811,587 | B1* | 11/2004 | Lorey | F24F 3/1607 454/187 |
| 2013/0331022 | A1* | 12/2013 | Sandman | F16L 21/002 454/251 |
| 2017/0234471 | A1* | 8/2017 | Oberlander | F16L 11/10 138/103 |
| 2019/0137129 | A1* | 5/2019 | Zhou | F24F 11/30 |

* cited by examiner

*Primary Examiner* — Robert Clemente
(74) *Attorney, Agent, or Firm* — William H. Honaker; Dickinson Wright PLLC

(57) ABSTRACT

A flexible industrial air filter system including a plurality of workstations, air filter units and a plurality of duct sections interconnected together to define a modular duct work grid. T-connectors are mounted between some of the sections with the workstations and air filter units positioned generally adjacent the T-connectors. Connection ducts interconnect the T-connectors and either the workstations or air filter units. Quick release connectors connect the connection ducts to the T-connectors and to the work stations and the air filter units such that the workstations and air filter units can be quickly added, removed, moved, and repositioned as desired.

3 Claims, 6 Drawing Sheets

AIR FILTER GRID SYSTEM

CROSS-REFERENCE TO RELATED APPLICATIONS

This utility application claims the benefit of U.S. Provisional Application No. 62/421,493 filed Nov. 14, 2016. The entire disclosure of the above application is incorporated herein by reference.

STATEMENT REGARDING FEDERALLY SPONSORED RESEARCH

NONE.

TECHNICAL FIELD

The present invention provides a unique modular, flexible and future-proof solution to air filtration needs within a manufacturing facility.

BACKGROUND OF THE INVENTION

Industrial air filter systems are well known. Typically, industrial air filters are either mobile source capture systems or centralized ducted systems. The mobile source capture systems use an air filter system that generally supports a single work station and can be moved to different locations in a facility. A centralized ducted system typically has a fixed air filter system that is connected to a centralized duct system that is then connected to the work stations. The air filter system of a centralized ducted system is normally very large in relation to a mobile source capture system and is located outside of the manufacturing building due to its size and its loud noise during operation.

Both mobile source capture systems and centralized ducted systems have advantages and disadvantages. The mobile system is flexible. It can be moved around a manufacturing floor, and units can be added and removed. However, mobile systems can be less efficient than centralized ducted system. Centralized ducted systems can be more efficient, but are not flexible. The centralized duct system is designed for a certain number of work stations and adding and removing is very difficult. Additionally, the work stations cannot be moved.

What is needed is a modular ductwork system with components that can be easily reconfigured as needs change to take advantage of the flexibility of a mobile system and the efficiency of a centralized system.

SUMMARY OF THE INVENTION

The present invention provides the efficiency and energy savings of a centralized ducted system, but with the flexibility to move components if needed, or add components for expansion purposes, or remove components when not needed. The present invention is a versatile low cost solution for air filtration needs.

The air filter grid system of the present invention gives you the flexibility of mobile source capture systems with the efficiency of a centralized ducted system. It's a whole-facility solution consisting of modular ductwork and components that can be easily reconfigured as needs change.

The grid system of the present invention is energy efficient. The ducted grid system only needs approximately 70% of the airflow used by individual units, delivering significant energy savings over time. It is a modular component to make installation of custom systems fast and easy. The grid system is flexible, allowing components to be moved around to expand or reduce capacity, and adjust the system to new requirements. The modular components and easy clamping system for the ductwork make it easy to change any configuration as needs change.

The flexible industrial air filter system of the present invention includes a plurality of workstations; a plurality of air filter units or mobile source capture units interconnected by a plurality of duct sections that are interconnected to define a modular duct work grid. T-connectors are mounted between some of the sections. The workstations and air filter units are positioned generally adjacent to the T-connectors.

Connection ducts interconnect the T-connectors to either the workstations or the air filter units. Quick release connectors connect the connection ducts to the T-connectors and to the work stations and the air filter units such that the workstations and air filter units can be quickly added, removed, moved, and repositioned as desired.

Further areas of applicability will become apparent from the description provided herein. The description and specific examples in this summary are intended for purposes of illustration only and are not intended to limit the scope of the present disclosure.

DETAILED DESCRIPTION OF THE DRAWINGS

The drawings described herein are for illustrative purposes only of selected embodiments and not all possible implementations, and are not intended to limit the scope of the present disclosure, wherein.

DETAILED DESCRIPTION OF THE INVENTION

Figure 1:
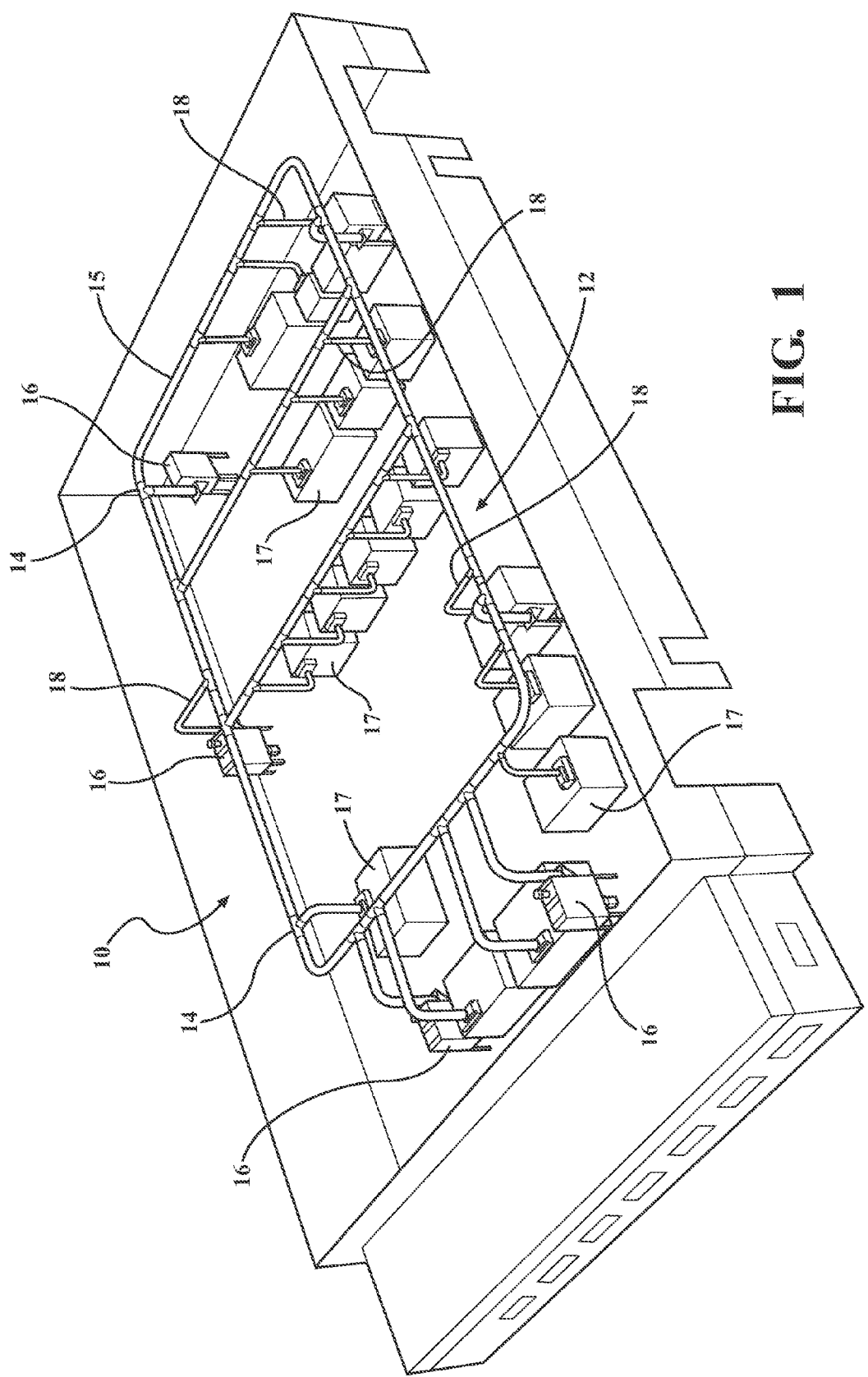
FIG. 1 is a perspective view of a manufacturing facility employing the air filter grid system of the present invention.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

The air filter grid system of the present invention is shown generally at 10 in FIG. 1. A primary modular duct work grid 12 is designed using ductwork 15 that snaps together for fast and easy setup and endless configuration options. The main ductwork 15 connecting all the workstation and the collectors or air filter units 16 is a consistent or uniform diameter or cross sectional area. This enables the same air suction pressure of volumetric flow rate to be utilized at any point along the ductwork grid 12, regardless of the distance from an adjacent air filter unit 16. Typically conventional fixed ductwork systems use ductwork that tapers up in size at each connection point to keep a consistent air flow velocity inside the ductwork, while the volumetric flow rate increases. However this is very limiting for flexibility in manufacturing operations to enable workstations to be moved to different locations and reconnected as the duct system becomes unbalanced due to the volumetric flow rate being at variance with the desired air flow velocity. An unbalanced ductwork system means that it will not be able to deliver the required suction pressure or volumetric air flow rate at the desired work stations. The grid ductwork system 15 of the present invention overcomes this limitation by using the uniform duct size at all points so that wherever a workstation is connected to the ductwork system 15, the desired volumetric air flow rate or suction pressure is available.

Figure 2:
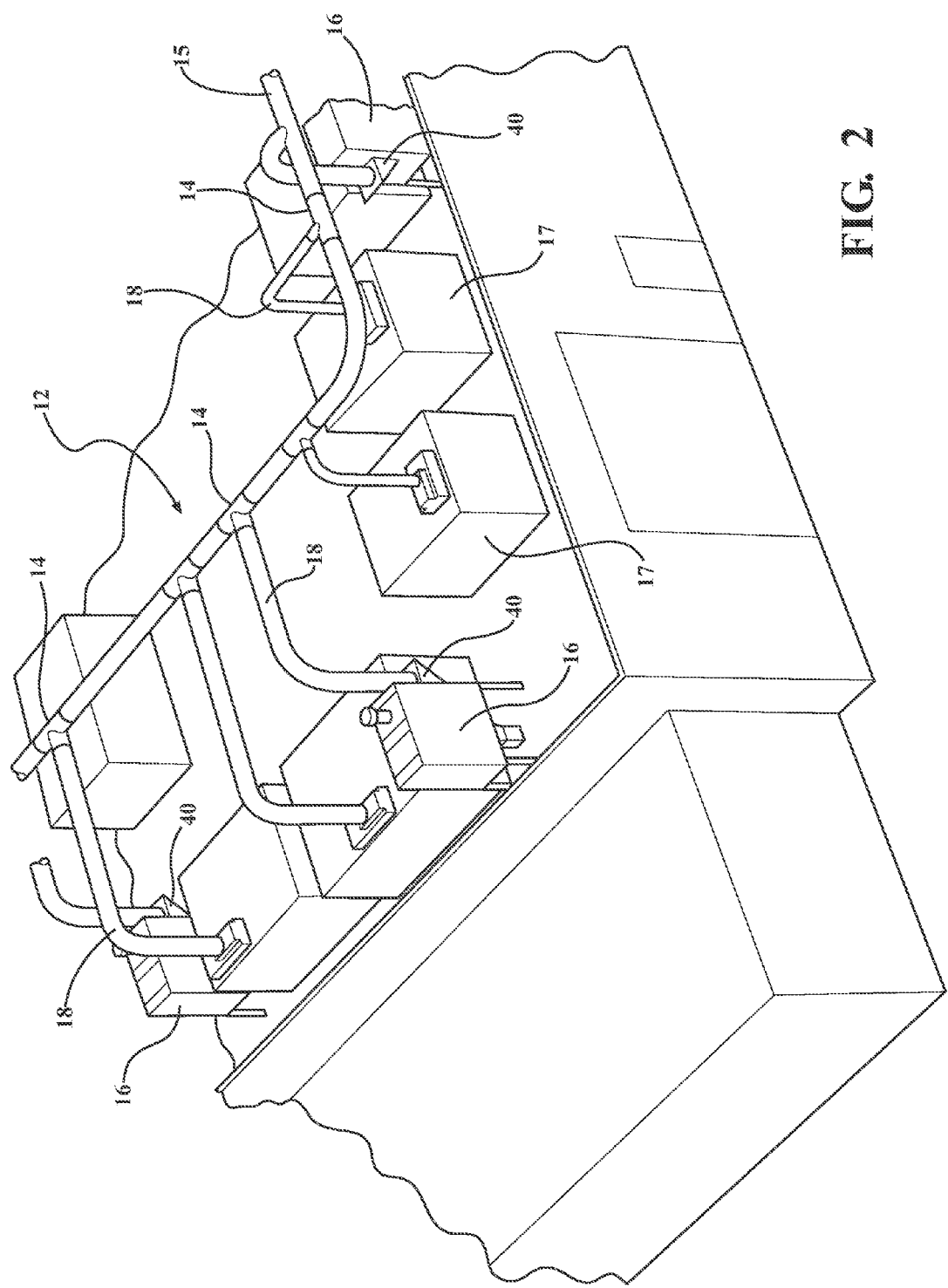
FIG. 2 is a partial perspective view of a manufacturing facility employing the air filter grid system of the present invention.

T-Connectors 14, see FIGS. 1 and 2 are configured to receive the ductwork 15 section, so you can place them anywhere on the grid. The T-Connectors 14 enable the airflow entering the ductwork system 15 from a workstation 17 to flow in either direction along the ductwork system 15 to the collector or air filter 16 that is adjacent or has available suction capacity. Typically air entering a system from a workstation would only flow in one defined direction, and would enter the ductwork system through a branch fitting which enforces the direction of flow.

Due to the geometry of the T-Connector 14 design, it is possible for air entering from a workstation 17 to flow in either direction through the grid ductwork system 12, to enable the most efficient configurations, as workstations are not active, and specific individual air filters 16 are turned off, to enable energy savings, or maintenance to be performed without interrupting the overall function of the grid system 12.

A plurality of air filters or collectors 16, see FIGS. 1, 3, and 5 through 7, provide maximum flexibility. A typical configuration would place the collectors 16 indoors operatively connected to work stations with production equipment, such as welding tables 17; however, outdoor configurations can be used when floor space is at a premium indoors. Applicant is the manufacturer and distributor of air filter or collector units 16 that would connect to the grid system 10 of the present invention. One of ordinary skill in the art will appreciate the types of air filters or collectors that would be connected to the grid of the present invention for maximum efficiency.

Connection ducts or drop-down suction ductwork 18, such as for example steel pipe ductwork connect the T-Connectors to the collectors 16 and production equipment 17. They easily connect anywhere along the grid system, so you can add or subtract collectors 16 and production equipment 17 and move them to wherever they are needed. This ductwork 12 and connection ductwork 18 preferably have no screws, no riveting, no brazing or welding, and require minimal cutting. The ductwork 12 and connection ductwork 18 are easy to assemble, reusable, reconfigurable duct components that assemble quickly and without tools.

Figure 4:
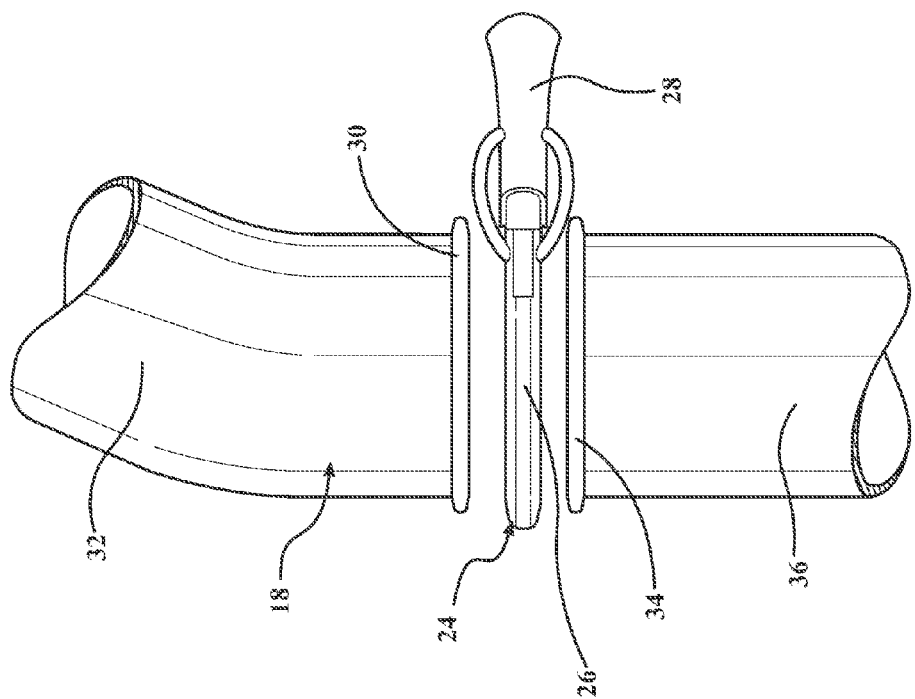
FIG. 4 is partial side view of a connection duct and quick release connector of the air filter grid system of the present invention.
Figure 3:
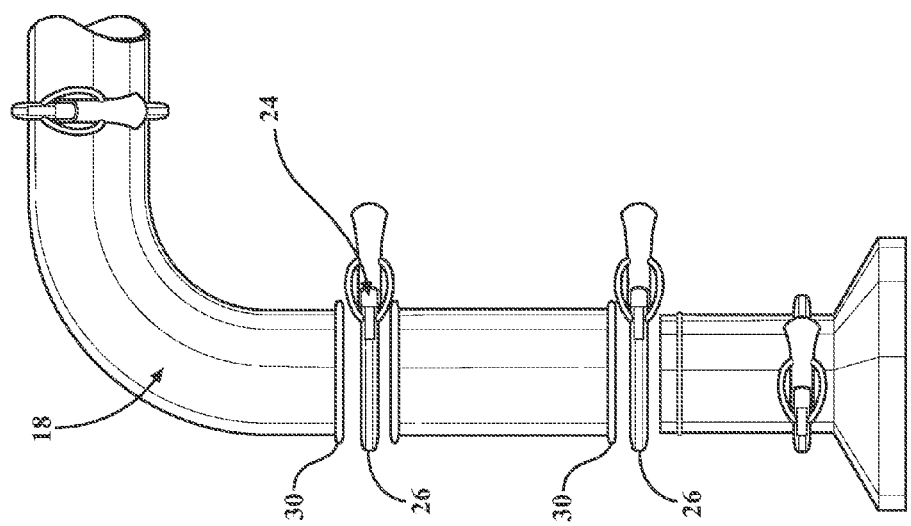
FIG. 3 is side view of a connection duct and quick release connector of the air filter grid system of the present invention.

With reference to FIGS. 3 and 4, the system preferably uses clamps 24 resulting in the ducts 15 and 18 having a smooth interior which is ideal for pneumatic transfer of material. The ductwork 15 and 18 is made of heavy-duty material that is durable and long-lasting. The clamps 24 are band type clamps having a ring body portion 26 and locking handle 28. The ring body portion 26 fits over and engages lip 30 on one of the sections 32 of the connection ductwork 18 or ductwork 15 and a flange 34 on the opposite section 36. By joining the sections 32 and 36, the ring 26 encompasses the lip 30 and flange 34. The locking handle 28 is depressed to contract the ring 26 and lock the sections 32 and 36 together. This type of clamp is available from Nordfab.

The ductwork is designed to handle air flow velocity from 1500 to 4500 ft/min. and typically around 2500 ft/min (FPM).

FIG. 2 illustrates an optional spark arrestor 40 that can be used in the event the operation produces sparks that require pre-treatment before entering the ductwork system or the collector 16. It will be appreciated by those of ordinary skill in the art that various spark arrestors could be used for arresting sparks. Applicant manufacturers and distribute a variety of spark arrestors which are ideal for this application.

The grid system 10 uses the same size ductwork components and collectors throughout working together on the same ductwork system 10. This allows the system to be easily configured and reconfigure for your unique needs.

Figure 5:
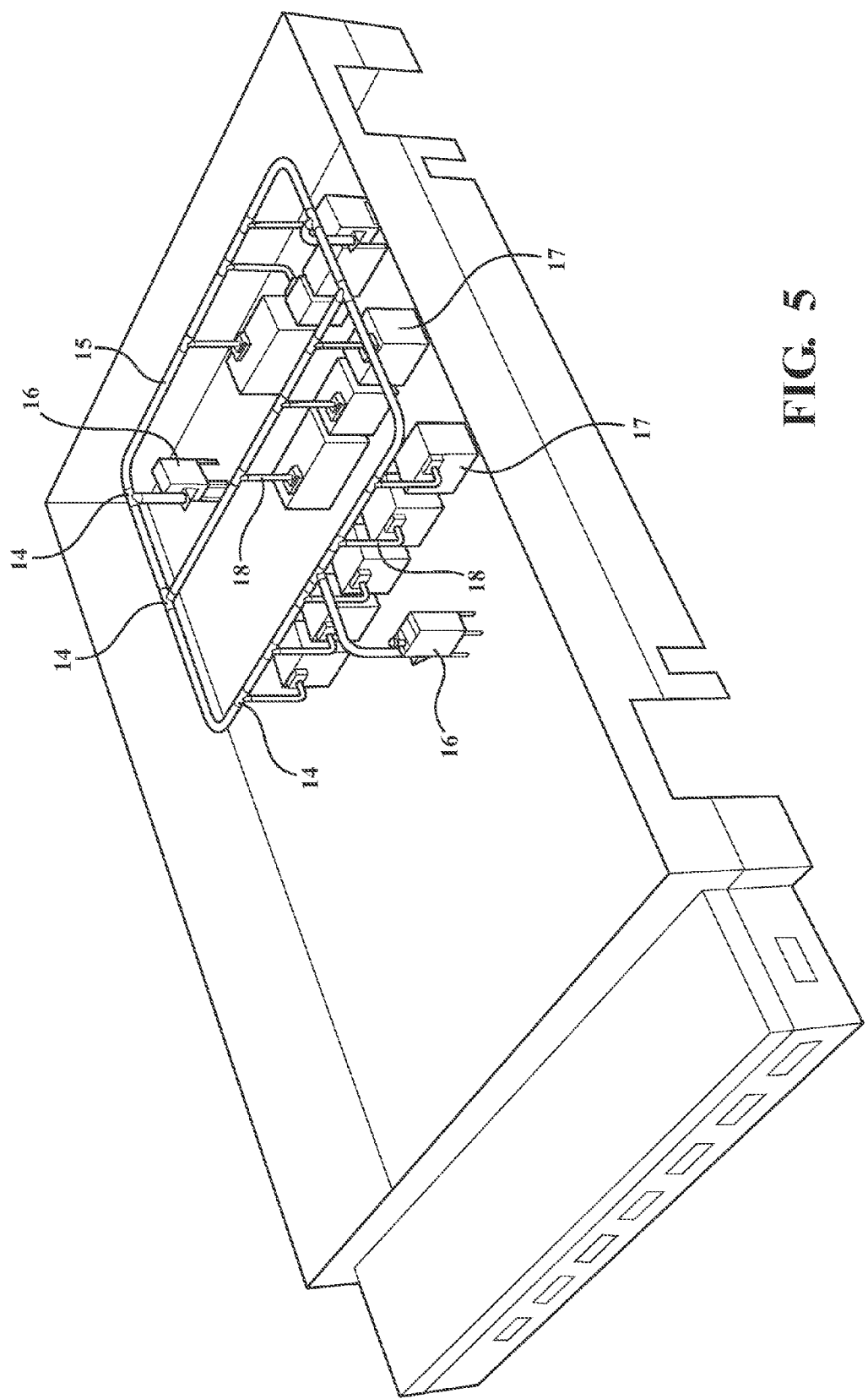
FIG. 5 is a perspective view of a manufacturing facility employing the air filter grid system of the present invention.

With reference to FIG. 5, an example of a plant floor is illustrated with an initial layout and floor plan design with multiple stations and collectors. This scenario depicts what a plant layout might look like in normal working and production conditions. As production needs fluctuate and facility-specific manufacturing processes change, the system can be easily altered to accommodate needs.

Figure 6:
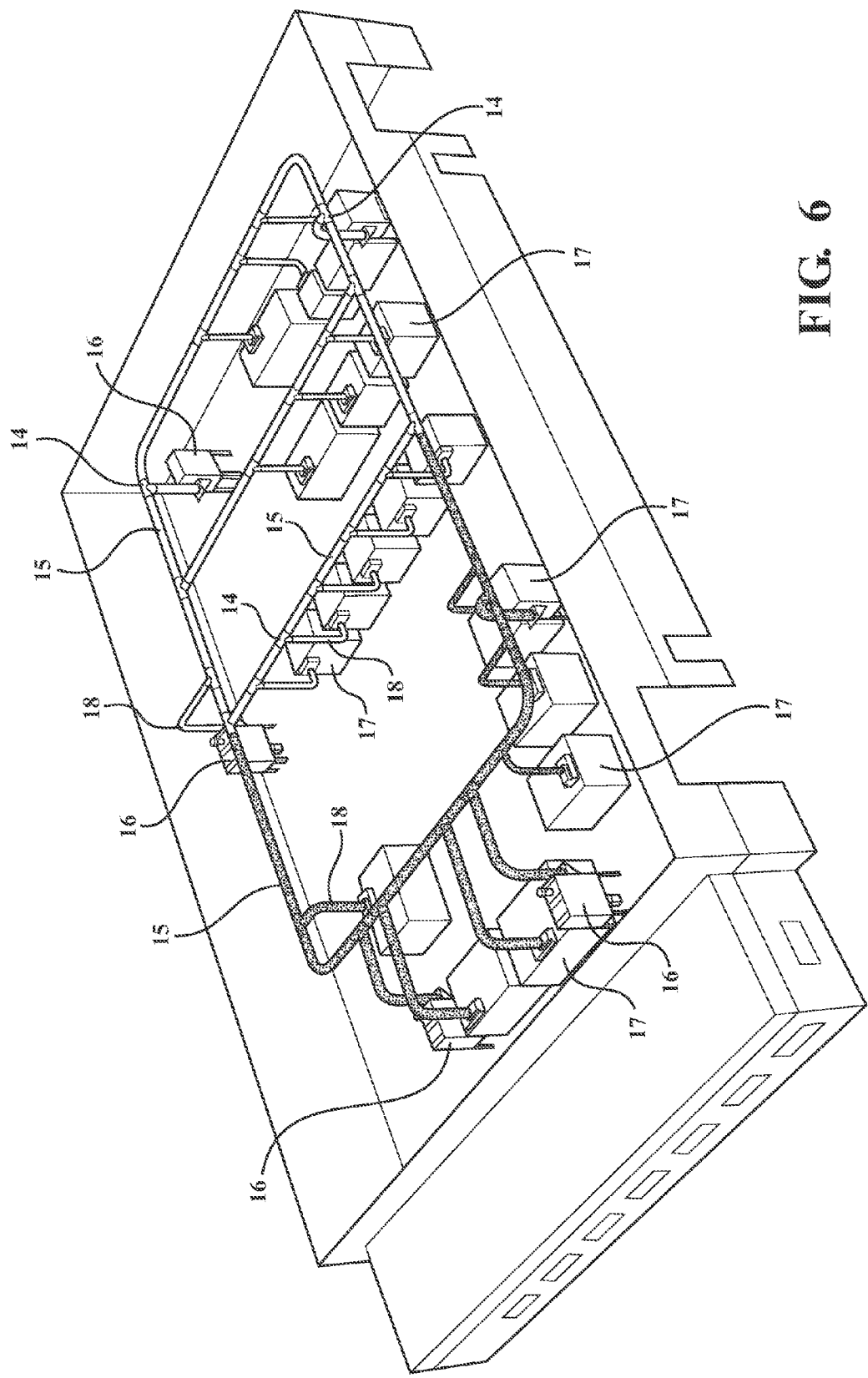
FIG. 6 is a perspective view of a manufacturing facility employing the air filter grid system of the present invention with workstations, grids and air filter units added.

With reference to FIG. 6, as needs change, the system can change. For example, consider a scenario where you add new welding stations, as seen here. In order to accommodate the additional welding fume output, you simply add additional collectors to the configuration. These are shown with the ductwork 15 being stippled.

Figure 7:
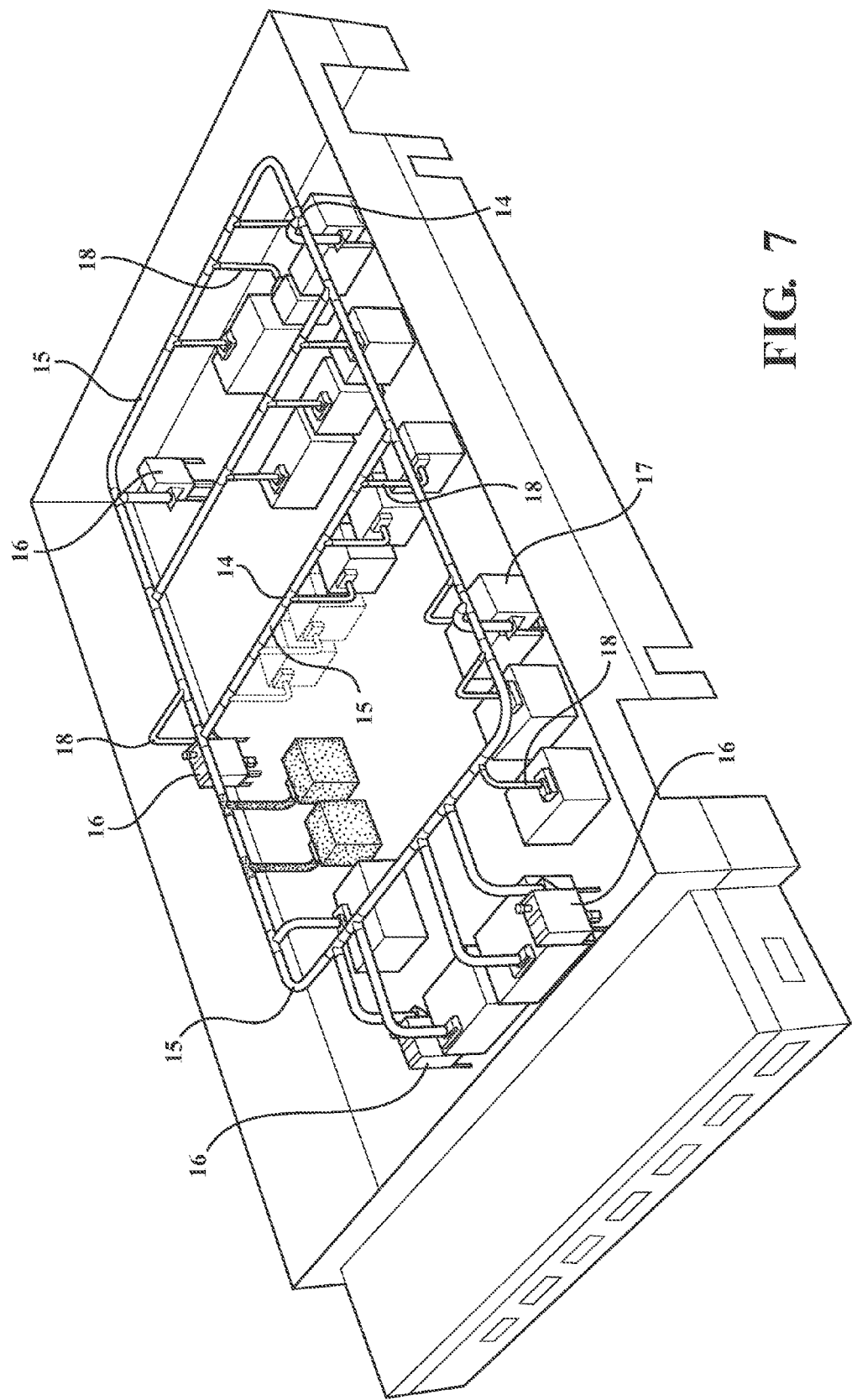
FIG. 7 is a perspective view of a manufacturing facility employing the air filter grid system of the present invention with workstations moved.

With reference to FIG. 7, an example is illustrated wherein two robotic welding stations have been moved to the other side of the plant. With the grid system 10, the collectors can be easily moved to wherever they are needed. The system will automatically self-balance to optimize the new configuration.

The ability to self-balance is a result of the uniform duct configuration used throughout the gird system 10 of the present invention.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A flexible industrial air filter system comprising:
a plurality of workstations;
a plurality of air filter units;
a plurality of duct sections interconnected together to define a modular duct work grid;
a plurality of T-connectors mounted between some of said sections; said workstations and air filter units being positioned generally adjacent said T-connectors;
connection ducts interconnecting said T-connectors and either said workstations and said air filter units;
quick release connectors connecting said connection ducts to said T-connectors and to said work stations and said air filter units;
such that said workstations and air filter units can be quickly added, removed, moved, and repositioned as desired.

2. The flexible industrial air filter system of claim 1, further including quick release connectors connecting said duct sections; such that said duct sections can be quickly added, removed, moved, and repositioned as desired.

3. A flexible industrial air filter system comprising:
a plurality of workstations;
a plurality of air filter units;
a main ductwork system;
t-connectors interconnecting said workstations and said air filter units to said main ductwork system, said main ductwork and said t-connectors having a uniform cross sectional area;
said air filter units pulling air from said workstations to create airflow entering said t-connectors and entering said main ductwork system and flowing to said air filter units;
said t-connectors enabling said airflow entering said main ductwork system from said workstations to flow in either direction along the main ductwork system said air filter units that are adjacent or have available suction capacity;
whereby said air suction pressure of volumetric flow rate remains constant at any point along said main ductwork system, regardless of the distance from an adjacent air filter unit.

* * * * *